US008445839B2

(12) United States Patent
Holaday et al.

(10) Patent No.: US 8,445,839 B2
(45) Date of Patent: May 21, 2013

(54) SELF-CALIBRATING, HIGHLY ACCURATE, LONG-LIVED, DUAL RHODIUM VANADIUM EMITTER NUCLEAR IN-CORE DETECTOR

(75) Inventors: Veldon D. Holaday, Lynchburg, VA (US); Richard C. Deveney, Forest, VA (US); Alexander Y. Cheng, Lynchburg, VA (US); John Wesley Davis, Forest, VA (US); Wesley D. Stults, Forest, VA (US)

(73) Assignee: Areva NP Inc., Lynchburg, VA (US)

( * ) Notice: Subject to any disclaimer, the term of this patent is extended or adjusted under 35 U.S.C. 154(b) by 29 days.

(21) Appl. No.: 12/904,362

(22) Filed: Oct. 14, 2010

(65) Prior Publication Data

US 2012/0091327 A1   Apr. 19, 2012

(51) Int. Cl.
*G21C 17/00*   (2006.01)
(52) U.S. Cl.
USPC .............. 250/252.1; 250/269.4; 250/269.5; 250/269.6; 250/269.7; 250/265; 250/370.05; 250/390.01
(58) Field of Classification Search
USPC ....................................... 250/269.4
See application file for complete search history.

(56) References Cited

U.S. PATENT DOCUMENTS

| 3,375,370 | A |   | 3/1968 | Hilborn et al. |
| 3,760,183 | A | * | 9/1973 | Neissel ..................... 250/370.04 |
| 3,879,612 | A |   | 4/1975 | Foster et al. |
| 3,904,881 | A |   | 9/1975 | Klar et al. |
| 4,197,463 | A |   | 4/1980 | Todt et al. |
| 4,363,970 | A | * | 12/1982 | Allan et al. .............. 250/390.01 |
| 4,426,352 | A |   | 1/1984 | Bybee et al. |
| 4,637,910 | A | * | 1/1987 | Impink, Jr. ..................... 376/216 |
| 4,637,913 | A | * | 1/1987 | Jacquot et al. ................. 376/247 |
| 5,251,242 | A |   | 10/1993 | Impink, Jr. et al. |
| 5,745,538 | A |   | 4/1998 | Heibel |
| 6,061,412 | A | * | 5/2000 | Stucker et al. ................. 376/217 |
| 2006/0165209 | A1 |   | 7/2006 | Cheng |
| 2007/0018110 | A1 | * | 1/2007 | McGregor et al. ............ 250/391 |

FOREIGN PATENT DOCUMENTS

WO   WO 97/13162   4/1997

OTHER PUBLICATIONS

Curca-Tivig et al., "Arcadia—A New Generation of Coupled Neutronics/Core Thermal-Hydraulics Code System at AREVA NP", Proceedings of the 2007 International LWR Fuel Performance Meeting, San Francisco, California, Sep. 3-Oct. 3, 2007, Paper 1070.
PCT International Search Report from PCT/US2011/052348, mailed on Jan. 20, 2012.

* cited by examiner

*Primary Examiner* — David Porta
*Assistant Examiner* — Djura Malevic
(74) *Attorney, Agent, or Firm* — Kenyon & Kenyon LLP

(57) ABSTRACT

The present invention provides a method and an apparatus for calibrating a first self-powered neutron detector for long term use in a nuclear reactor core with a second self-powered neutron detector, where the emitter material of the second self-powered neutron detector has a neutron absorption cross-section that is greater than the neutron absorption cross-section of the first emitter material for the first self-powered neutron detector.

9 Claims, 4 Drawing Sheets

SELF-CALIBRATING, HIGHLY ACCURATE, LONG-LIVED, DUAL RHODIUM VANADIUM EMITTER NUCLEAR IN-CORE DETECTOR

FIELD OF THE INVENTION

The present invention is directed to self-powered in-core neutron detectors for nuclear reactors. In particular, the present invention provides a method and an apparatus in which one self-powered in-core neutron detector is calibrated by a second self-powered in-core neutron detector, used as a calibration reference, in the core of an operating nuclear reactor.

BACKGROUND OF THE INVENTION

Self-powered in-core neutron detectors are commonly used to measure the core power distribution in commercial nuclear power reactors, as such detectors are known to provide a direct measure of neutron flux, which is directly related to core power. Typically, self-powered in-core neutron detectors are placed in a fixed position in a nuclear reactor core, and are replaced only during reactor refueling operations. The fixed detectors remain in the same fuel assembly locations, at the same axial position during the entire core cycle. That is, the detectors are inserted into the instrumentation tube of the relevant fuel assemblies after loading of the fuel assemblies in the core, and are removed from the instrumentation tube before the fuel assemblies are repositioned within the core.

In-core neutron detectors, i.e., detectors positioned within the core of a nuclear reactor, allow reactor operators to monitor the reactor core conditions and to calculate and continually observe reactor core power distribution with greater accuracy than with ex-core detectors, i.e., detectors positioned outside the core of a nuclear reactor. That yields increased margins to thermal limits, providing for higher allowable power levels or peaking factors, additional operating space, and/or added flexibility in fuel management.

Self-powered in-core neutron detectors are disclosed in U.S. Pat. No. 3,375,370. The self-powered in-core neutron detectors have an emitter, formed of a conducting or semi-conducting material that emits electrons as a result of neutron irradiation, a collector that produces few electrons compared to the emitter when exposed to a neutron flux, and an insulator between the emitter and collector. Preferably, the electrical properties of the insulator remain substantially unchanged when exposed to intense radiation fields for extended periods of time. The signal from the detector is reported to be directly proportional to the rate of absorption of neutrons by the detector.

As reported in Table 1 of U.S. Pat. No. 3,375,370, known materials that can function as emitters include rhodium, vanadium, aluminum, silver, cadmium, gadolinium, cobalt, and scandium; known collector materials include aluminum, magnesium, titanium, nickel, stainless steel, nickel-chromium alloys, and zirconium-aluminum alloys, and known insulators include aluminum oxide, zirconium oxide, magnesium oxide, and silicon oxide.

Emitters emit electrons as a result of neutron capture by nuclei of emitter atoms, followed by beta decay of the resulting activated nuclei, where the beta decay comprises conversion of a neutron to a proton with the emission of a beta particle, i.e., an electron, by the capture product. For example, in a rhodium emitter, the $^{103}$Rh nucleus absorbs a neutron, and is thereby converted to $^{104}$Rh. The $^{104}$Rh nucleus then undergoes beta decay, emitting gamma and beta radiation, i.e., a gamma ray photon and an electron. A fraction of the energetic electrons escape the emitter, and are collected in the detector sheath. A small fraction of the electrons are emitted promptly after neutron absorption, and the remainder of the activated nuclei undergoes beta decay with a half-life of 42 seconds.

Detector emitter signals are typically amplified, digitized, and then processed to correct for background emissions and emitter burn-up effects. For a rhodium emitter, the absorption of a neutron by a $^{103}$Rh nucleus followed by the beta decay of the resulting $^{104}$Rh nucleus increases the atomic number of the nucleus by one. The nucleus is, thus, transmuted to a $^{104}$Pd (palladium-104) nucleus, thereby decreasing the amount of $^{103}$Rh available in the emitter to absorb additional neutrons. As a result, the signal produced by an emitter decreases with use as a result of emitter burn-up. The rate of this decrease is well known for some emitters, such as rhodium, but is relatively uncertain for other emitters.

As each capture-emission event results in a change in atomic mass and number, the signal produced by the emitter and the lifetime of the emitter are functions of the neutron absorption cross-section of the emitter material. Thus, rhodium, which is commonly used as an emitter in self-powered in-core neutron detectors, produces a signal that is approximately 15 times the signal produced by vanadium, but has a significantly shorter lifetime compared to that of vanadium as can be seen in column 4, lines 26 to 32, and Table 2 of U.S. Pat. No. 3,375,370.

U.S. Pat. No. 3,879,612 discloses a multi-sensor radiation detection system for measuring neutron flux, joined as a unitary structure. The joined unitary structure of the system includes a self-powered detector and an ion or fission chamber, which are connected electrically in parallel, for removable insertion into a nuclear reactor, as a radiation detector probe. When connected to a load impedance, the detection system provides a neutron flux signal from only the self-powered detector. When connected to the load impedance and a voltage source, the detection system provides a neutron flux signal that is essentially just the neutron flux signal from the ion or fission chamber, as the neutron flux signal from that detector is substantially greater than the signal from the self-powered detector. The self-powered probe functions in the manner of the self-powered in-core neutron detectors disclosed in U.S. Pat. No. 3,375,370, discussed above. Self-powered in-core neutron detectors with rhodium and vanadium emitters are exemplified, but there is no disclosure of the use of rhodium and vanadium emitters together.

U.S. Pat. No. 3,904,881 discloses a self-powered neutron detector that compensates for the gamma radiation sensitivity of emitter materials in neutron detectors. Each detector contains two emitter materials having different sensitivities to gamma radiation, where one or both of the emitter materials are also sensitive to a neutron flux. In one arrangement, the first emitter material forms an emitter sensitive to both a neutron flux and gamma radiation, and the second emitter material forms an emitter sensitive to gamma radiation that is practically insensitive to a neutron flux, where the two emitters are contained by a single collector and separated by an insulating material. The signals from the two emitters in the detector are used to compensate for any signal from gamma radiation. In a second arrangement, the two emitter materials are formed into a single emitter, where both materials are sensitive to gamma radiation, but have opposite polarities, and, together, form a single emitter. The difference in polarity compensates for the gamma radiation signal. Combinations of two emitter materials used in a single detector include rhodium-vanadium.

U.S. Pat. No. 4,426,352 discloses an array of pairs of neutron detectors, where each pair has a prompt response detector, which responds substantially instantaneously to changes in neutron flux, and a delayed response neutron detector, which only reaches equilibrium after a period of time following the end of a change in neutron flux. The pairs of detectors are spaced axially along the active fuel height of a reactor core. As delayed response detectors typically require at least about a minute to provide a useful signal, delayed response neutron detectors cannot be used in a reactor control or safety channel, and are limited to providing a history of power distributions and variations during power operating modes. In the disclosed pairs, the delayed response detectors, which are more accurate, provide a generally continuous neutron flux calibration for the less accurate prompt response detectors. The disclosed detector pairs have a delayed response rhodium detector paired with a prompt response hafnium detector. According to U.S. Pat. No. 4,426,352, rhodium has only the one mode of neutron activation described above, and depletes slowly enough to allow a depletion correction to be made accurately, such that, under steady-state conditions, the signals from a prompt response hafnium can be calibrated easily using the power derived from the paired rhodium detector signal.

U.S. Pat. No. 5,251,242 discloses the marketing of a detector arrangement consisting of several independent, relatively short rhodium detectors and a single, full length vanadium based detector. Reportedly, the vanadium has a low, but non-negligible, neutron absorption cross-section, reportedly 4.5 barns at 2200 m/sec, compared to 156 barns for rhodium. However, a relatively massive vanadium emitter reportedly generated a usable signal, while experiencing only a very slow depletion that results from transmutation. According to U.S. Pat. No. 5,251,242, in principle, it could be possible to use the output signal from the long vanadium detector as a reference against which to compare the signals generated by the individual rhodium detector sections to track the rate of depletion of the rhodium detectors due to neutron induced transmutation. However, the output signal of the single long vanadium detector characterizes only a spatial integral of a complex and time varying axial power distribution. Thus, the patent discloses that relating the individual rhodium detector signals to the signal from the long vanadium detector is problematic.

Instead, U.S. Pat. No. 5,251,242 discloses the utilization of platinum detector segments axially distributed within the reactor assembly along with spatially congruent, corresponding length vanadium detector segments in the same assembly. The vanadium detectors are used to calibrate platinum detector signals, removing the gamma ray flux contributions of decay products from the platinum detector response signals. Alternatively, a full length platinum detector is paired with a full length vanadium detector to calibrate the full length platinum detector against the full length, spatially congruent vanadium detector to determine the necessary compensation for the gamma ray sensitive short platinum segments in the reactor.

U.S. Patent Application Publication No. 2006/0165209 discloses the prior art placement along intervals of the axial direction of a nuclear fuel assembly of equivalent length gamma energy detectors with a set of companion vanadium detectors, as well as the placement of cobalt detectors at equal lengths down the axial length of a nuclear fuel assembly with companion vanadium detectors.

International Publication No. WO 97/13162 discloses self-powered, fixed in-core detectors having a vanadium neutron sensitive detector element and a gamma radiation sensitive detector element that is preferably platinum. The neutron sensitive vanadium emitter element has a low neutron absorption cross-section, and extends the length of the active fuel region, generating a full length signal representative of full length reactor power. The gamma radiation sensitive detector element includes a number of parallel gamma sensitive emitter elements, preferably platinum, but alternatively zirconium, cerium, tantalum, or osmium elements, providing sequentially increasing overlap with the neutron sensitive emitter element to define axial regions of the active fuel region and generate apportioning signals. The portion of the full length signal generated by the neutron sensitive emitter element attributable to each of the axial regions of the core is determined from ratios of the apportioning signals generated by the gamma sensitive elements. The ratio of the apportioning signals reduces the effects of delayed gamma radiation from the products of fission, and the transient response is reportedly further improved by filtering out that component of the apportioning signals generated by the gamma sensitive emitter elements.

There is no known prior art that provides for the calibration of a long-lived, low neutron absorption cross-section self-powered in-core neutron detector during the operation of a nuclear reactor by a high neutron absorption cross-section self-powered in-core neutron detector, having a significantly shorter lifetime, such that the long-lived self-powered in-core neutron detector can be used after the short-lived detector has ceased to be useful due to depletion of the emitter material.

SUMMARY OF THE INVENTION

The present invention is directed to a method and an apparatus for calibrating a first self-powered neutron detector with a second self-powered neutron detector for long term use of the pair of self-powered neutron detectors in a nuclear reactor core. As will be understood by those skilled in the art, the lifetime of a self-powered neutron detector is a function of several factors, mainly the total irradiation exposure of the neutron detector. As a result, the lifetime of a neutron detector can differ significantly depending on the location and axial position of the neutron detector in the core. A self-powered neutron detector positioned in a relatively high neutron flux section of the core may, thus, have a lifetime of only a single reactor cycle. In contrast, a self-powered neutron detector positioned in a relatively low neutron flux section of the core may have a lifetime of multiple reactor cycles.

The method of the invention comprises: exposing at least one pair of self-powered neutron detectors to a neutron flux in a nuclear reactor, where each of the self-powered neutron detectors in the pair produces a signal proportional to the same neutron flux. The pair of self-powered neutron detectors comprises a first self-powered neutron detector and a second self-powered neutron detector. Each of the first and second self-powered neutron detectors in the pair comprises an emitter and a collector. The emitter of the first self-powered neutron detector in each pair comprises a first emitter material, and the emitter of the second self-powered neutron detector in each pair comprises a second emitter material, where the second emitter material has a neutron absorption cross-section that is greater than the neutron absorption cross-section of the first emitter material.

In the method of the invention, the response of each of the first and second self-powered neutron detectors to the same neutron flux in the nuclear reactor core is simultaneously measured using a data acquisition system, and the signal produced by the first self-powered neutron detector in the pair in response to the neutron flux is calibrated with the signal produced by the second self-powered neutron detector in the pair in response to the neutron flux over a period of time sufficient to determine the thermal neutron sensitivity for the first emitter material for a given emitter depletion.

Preferably, the emitter of the first self-powered neutron detector comprises vanadium, and the emitter of the second self-powered neutron detector comprises rhodium. Preferably, the neutron flux within the nuclear reactor core is monitored with the rhodium self-powered neutron detectors until the rhodium in the rhodium self-powered neutron detectors is highly depleted, and then the neutron flux is monitored with the calibrated vanadium self-powered neutron detector. Preferably, the monitoring of the neutron flux with the calibrated vanadium self-powered neutron detector begins when the sensitivity of the rhodium detector has been depleted by about 68 percent. That is the sensitivity of the rhodium detector to neutrons has been reduced by depletion of the rhodium in the detector to about 32 percent of the sensitivity of the detector before irradiation. However, it has been found that the monitoring of the neutron flux with the calibrated vanadium self-powered neutron detector can be delayed until the sensitivity of the rhodium detector has been depleted by about 80 percent.

It should be noted that the sensitivity depletion of a self-powered neutron detector is typically not the same as the material depletion of the detector. For example, a 68 percent sensitivity depletion of a rhodium detector typically corresponds to about an 80 percent depletion of the rhodium in the detector.

Once the monitoring of the neutron flux is switched over from the second self-powered neutron detector to the calibrated first self-powered neutron detector, the response of the depleted second self-powered neutron detector can then be calibrated with the response from the calibrated first self-powered neutron detector.

The apparatus of the invention comprises at least one pair of self-powered neutron detectors, where each self-powered neutron detector produces a signal proportional to a neutron flux when exposed to the neutron flux. The pair comprises a first self-powered neutron detector and a second self-powered neutron detector, and each of the first and second self-powered neutron detectors in the pair comprises an emitter and a collector. The emitter of the first self-powered neutron detector in each pair comprises a first emitter material, and the emitter of the second self-powered neutron detector in each pair comprises a second emitter material, where the second emitter material has a neutron absorption cross-section that is greater than the neutron absorption cross-section of the first emitter material. Both detectors of the pair are positioned within a nuclear reactor, such that the first and second self-powered neutron detectors in the pair are exposed to the same neutron flux field. The second self-powered neutron detector provides a calibration signal for the first self-powered neutron detector of the pair when exposed to a neutron flux. Preferably, first emitter material is vanadium, and the second emitter material is rhodium.

DETAILED DESCRIPTION OF THE PREFERRED EMBODIMENTS

Figure 1:
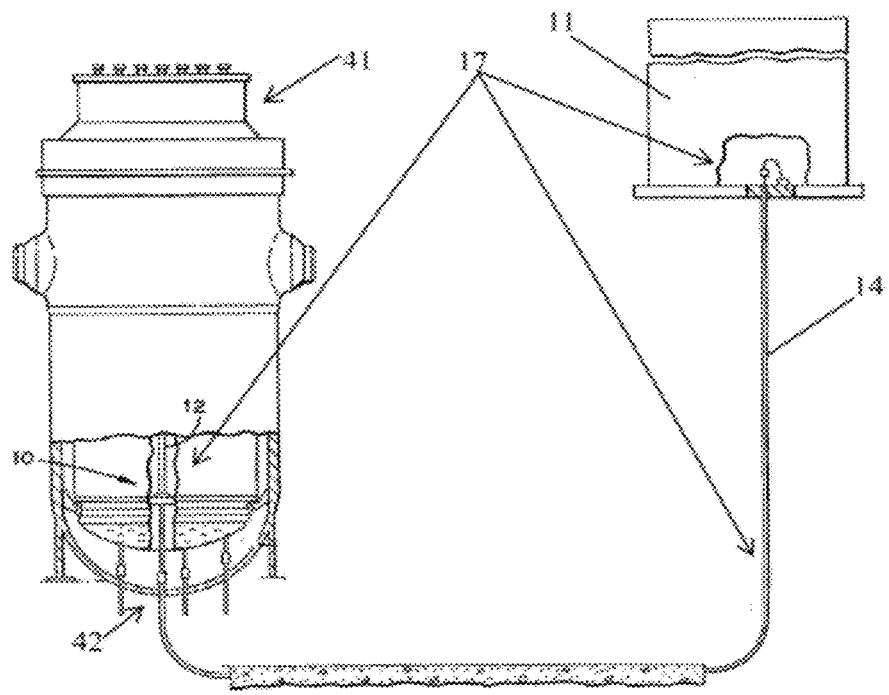
FIG. 1 illustrates an apparatus of the invention.

The present invention is directed to a method and an apparatus in which the signal from a first self-powered in-core neutron detector is calibrated using the signal from a second self-powered in-core neutron detector in the core of an operating nuclear reactor, such that the second in-core neutron detector is used as a calibration reference. Preferably, the nuclear reactor is a light water reactor, such as a pressurized water reactor (PWR) or a boiling water reactor (BWR).

Preferably, the self-powered neutron detectors used in the invention are those of the type disclosed in U.S. Pat. No. 3,375,370. Such self-powered in-core neutron detectors have an emitter, formed of a conducting or semiconducting material that emits electrons as a result of neutron irradiation, a collector that produces few electrons compared to the emitter when exposed to a neutron flux, and an insulator between the emitter and collector, where the electrical properties of the insulator preferably remain substantially unchanged when exposed to intense radiation fields for extended periods of time. As will be understood by those skilled in the art, the neutron flux is a measure of the number of neutrons that cross a given area on the surface of each neutron detector per unit time. Most preferably, the emitter material is rhodium or vanadium, where each rhodium self-powered neutron detector, which is used as a reference detector, is typically paired with a vanadium self-powered neutron detector, which is calibrated in the invention.

Preferably the purity of the rhodium and vanadium in the emitters is very high, and, most preferably, greater than 99 percent. Useful insulation materials are known in the art, and preferably have a resistance greater than 10 GΩ (10 billion ohms). Aluminum oxide has been proven to be particularly useful and effective. As discussed above, known collector materials include aluminum, magnesium, titanium, nickel, stainless steel, nickel-chromium alloys, and zirconium-aluminum alloys. Preferably, the collector material is a nickel based material, such as INCONEL® 600, which is available from Special Metals Corporation. INCONEL® 600 is an alloy, containing 72 percent nickel, 14 to 17 percent chromium, 6.0 to 10 percent iron, 1 percent manganese, 0.5 percent copper, 0.5 percent silicon, 0.15 percent carbon, 0.015 percent sulfur. Preferably, filler wires, positioned in the detector assembly to act as spacers to maintain the bundle configuration of the detector assembly, and to axially position the detector, and lead wires, connected to the emitter to convey the detector signal from the emitter to the data acquisition system, are formed from the same material as the collector, which is preferably a nickel-based alloy, such as INCONEL® 600.

Typically, a rhodium detector useful in the invention has an outside diameter of 0.054 to 0.062 inch, where 0.062 inch is preferred, an insulation thickness, i.e., the distance between the emitter and the inner surface of the collector, of 0.012 inch, a rhodium emitter diameter of 0.018 inch, where the remainder of the overall diameter is the thickness of the collector. The lead wire diameter is about 0.009 inch. A typical vanadium detector has an outside diameter of about 0.0560 to about 0.0824 inch, a vanadium emitter diameter of 0.0200 to 0.0384 inch, where the preferred diameter of the vanadium emitter is 0.0384 inch, and an insulation thickness, a thickness of the collector and a lead wire diameter substantially the same as for rhodium detectors. The thickness of the collector for both rhodium and vanadium detectors is typically about 0.006 to about 0.010 inch. Preferably, the distance between the rhodium and vanadium detectors is about 0.15 to 0.30 inch, and, typically, depends on the size of the guide tubing and the instrumentation tube of the fuel assembly for housing the detector assembly and on the number of detectors used.

Although the present invention is disclosed herein in terms of rhodium/vanadium pairs, the invention is not limited to such rhodium/vanadium pairs. Instead, the present invention is directed to neutron sensitive detectors and the inter-calibration of such neutron sensitive detectors for extension of the lifetime of the detector pair. Preferably, the neutron sensitive detectors are self-powered neutron detectors. Thus, the present invention is fundamentally different from prior art systems for calibrating one of a pair of detectors, comprising a neutron sensitive detector and a gamma sensitive detector, such as the paired detectors used in protection systems.

For available neutron sensitive detectors, rhodium and vanadium are most preferred due to the desirable characteristics of such detectors, including the magnitude of signals, possible life of the detectors, simplicity of the emitter reactions, and purity. In addition, at present, rhodium is the only emitter material for which detailed knowledge of the depletion characteristics is available. However, as will be recognized by those skilled in the art, as detailed knowledge of the depletion characteristics becomes available for other emitter materials, the present invention can be applied to detectors utilizing emitter materials other than rhodium and vanadium.

The first and second self-powered in-core neutron detectors are paired for long term use in a nuclear reactor core. As used herein, the term "long term use" is a function of the position of the self-powered in-core neutron detectors in the nuclear reactor core. The lifetime of a self-powered neutron detector is a function of several factors, mainly the total irradiation exposure of the neutron detector. As a result, the lifetime of a neutron detector can differ significantly depending on the location and axial position of the neutron detector in the core. A self-powered neutron detector positioned in a relatively high neutron flux section of the core may, thus, have a lifetime of only a single reactor cycle. In contrast, a self-powered neutron detector positioned in a relatively low neutron flux section of the core may have a lifetime of multiple reactor cycles. Thus, for a detector exposed to a relatively high neutron flux section of the core, the "long term use" of a detector may be the length of an additional single reactor cycle, but may be the length of several additional reactor cycles when exposed to a relatively low neutron flux. Those skilled in the art will understand how the neutron flux varies from position to position within a nuclear reactor core. Preferably, with the method of the invention, the long term use of a pair of neutron detectors is over multiple reactor cycles.

Preferably, at least one detector pair is positioned in a nuclear fuel assembly in the reactor core. The emitter of the second or reference detector has a higher cross-section for neutron capture than the emitter of the first or calibrated detector. Therefore, the usable lifetime of the reference detector before depletion of the emitter material is significantly less than the usable lifetime of the calibrated detector. In addition, the initial neutron detection response of the reference detector is significantly greater than the initial neutron detection signal of the calibrated detector. However, as the lifetime of the calibrated detector is greater, the lower neutron detection response of the calibrated detector changes more gradually than that of the reference detector, such that, eventually, the response to neutron flux of the calibrated detector becomes greater than that of the reference detector.

Preferably, the emitter material of the reference detector comprises rhodium, and the emitter material of the calibrated detector comprises vanadium. However, any combination of self-powered neutron detectors can be used in the invention, as long as there is a significant difference in the neutron capture cross-sections of the different emitter materials of the paired detectors, such that the useful lifetime of the calibrated detector is longer than that of the reference detector. Rhodium is preferred as the material for the emitter of the reference detector, as the emitter burn-up properties are well known for rhodium. Vanadium is preferred as the material for the emitter of the calibrated detector, as neutron capture by and transmutation of vanadium results in a very slow depletion of the emitter material.

As the neutron flux response to the reference detector in each pair decreases as the emitter material is transmuted, the neutron flux response for that detector will become less reliable. However, by the time the sensitivity of the reference detector is significantly depleted, e.g., about 68 to about 80 percent for a rhodium detector, the second detector will be well calibrated. Therefore, the calibrated detector can then be used to calibrate the more highly depleted reference detector, thereby providing a two-way calibration.

The calibration of a neutron-sensitive detector with another neutron-sensitive detector depends only upon the amount of use and, thus, the amount of emitter depletion in the detectors, and is relatively straight-forward. The calibration process is performed substantially continuously, i.e., instant-by-instant, during the operation of the reactor, and provides an accurate history of the effects of neutron flux on the detectors for the calibration.

Figure 8:
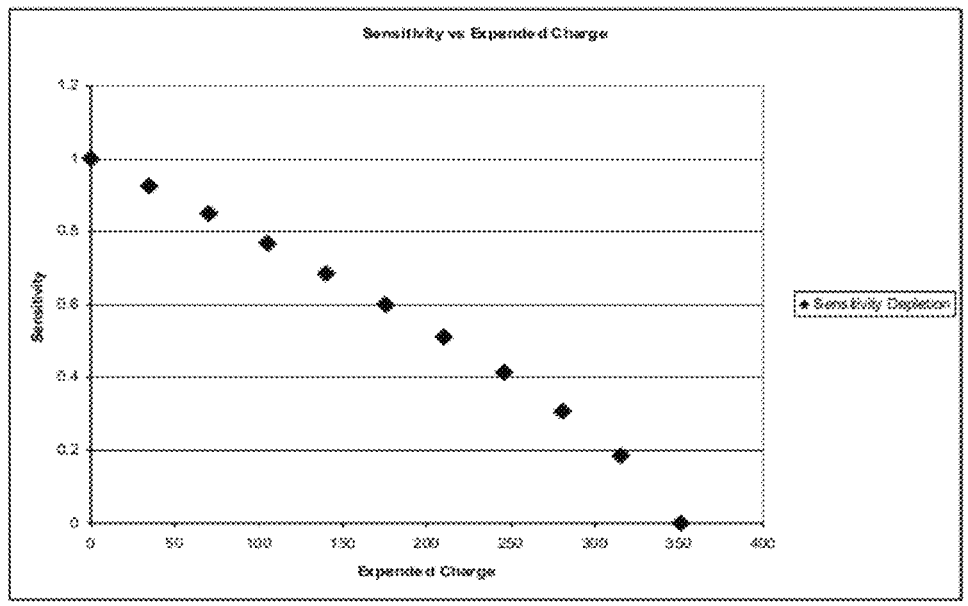
FIG. 8 illustrates a plot of the normalized sensitivity against the expended charge for a rhodium self-powered neutron detector.
Figure 9:
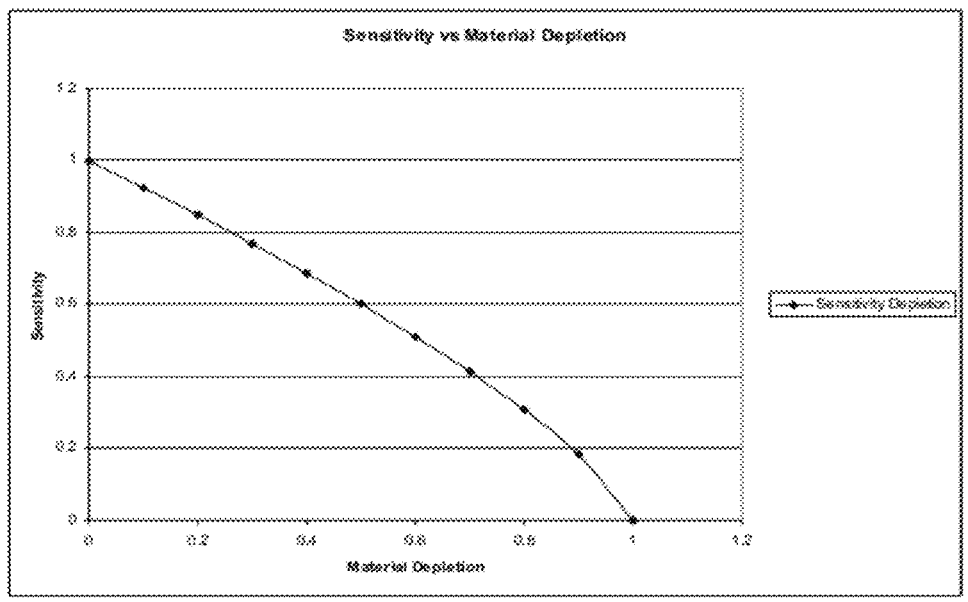
FIG. 9 illustrates a plot of the normalized sensitivity against emitter depletion for a rhodium self-powered neutron detector.

The self-powered neutron detectors are preferably calibrated as follows:

The signals from the self-powered neutron detectors are amplified and measured using amplifiers and signal capture circuits of a type well known in art, such as those disclosed in U.S. Pat. No. 3,375,370. Preferably, background signals generated by gamma emissions are subtracted using a preamplifier system. Again, such preamplifiers are well known to those skilled in the art. The measured signals from the rhodium detectors, which are preferably background-excluded, are first converted, using the depletion-correction correlation known for rhodium, to signals that correspond to those that would be obtained for equivalent new rhodium detectors. Plots of the change in sensitivity of a rhodium self-powered neutron detector against expended charge, i.e., the time-integrated measured signals from the response of the emitter material in Coulombs, and material depletion are illustrated in FIGS. 8 and 9, respectively. As will be understood by those skilled in the art, the sensitivity value plotted in FIGS. 8 and 9 is a unitless fraction that is equal to the measured response signal from the detector divided by the initial response signal measured for the detector. Similarly, the material depletion value plotted in FIG. 9 is a unitless fraction that is equal to the amount of emitter material transmuted following neutron capture divided by the initial amount of emitter material in the detector.

The depletion-corrected signals are then converted to powers based on the conversion factors generated with a neutronic code system. Currently, most neutronic systems for this purpose include a three-dimensional, 3-D, core code and a two-dimensional, 2-D, spectrum code, such as for instance the ARCADIA code system, available from AREVA NP, and discussed at the 2007 San Francisco International LWR Fuel Performance Meeting. The 3-D core code simulates the real full core of interest by nodes with each node representing a fraction, typically 25 or 100 percent, of a fuel assembly in the radial direction and several inches, about 3 to 10 inches, in the axial direction. The required characteristics of each node in this 3-D core code are generated using an infinite lattice model with the 2-D spectrum code and with the basic physics and mechanical data for the radial slice of the fuel assembly that includes the node of interest.

In the preferred calibration process, the measured signals from the vanadium detectors, which are also background-excluded, are processed in the same manner. However, for the vanadium detectors, the depletion-correction correlation is not yet known. At the start of the calibration process, a linear relationship is typically assumed for the depletion-correction correlation between the vanadium detector sensitivity and the vanadium expended charge with an initial estimate of the slope set by an estimate of the total charges available. The estimate of the total charges available is obtained using the predicted reaction rates of a new vanadium detector and the measured signals from a new vanadium detector. The resulting powers are then compared to the powers generated with the measured signals from rhodium detectors. These comparisons are then used to adjust the assumed slope, in an iterative process, to match the resulting powers converted from the signals measured by the vanadium and rhodium detectors.

After accumulating data over time, e.g., over one or two cycles of operation, the functional form of the depletion-correction correlation for the vanadium detector is preferably changed from the linear form to an exponential form similar to the form of the depletion-correction correlation for the rhodium detector, as such a form is more theoretically correct based on the physical behavior of the detectors. Continuing such adjustments over several additional cycles provides a reasonably accurate depletion-correction correlation for the vanadium detector with the desired exponential form before the end of the lifetime of the rhodium detector is reached.

In addition to providing a measure of changes in the isotopic number densities of the emitters that results from exposure to a neutron flux, an accurate history of the effects of neutron flux on the detectors also provides a measure of how the detector response changes over time due to exposure to the neutron flux. For example, after a vanadium emitter has been in use and, thus, burned for a period of time, the vanadium isotopic number density is partially depleted, and the beta escape probability within the vanadium detector is changed as well. As the neutron absorption cross-section of vanadium is relatively small, such that a vanadium emitter depletes slowly, the expected lifetime for a vanadium emitter is much longer than that of a rhodium emitter. Over the expected lifetime of a vanadium emitter, the properties of the detector, including the total isotopic number density and the distribution of the number density within the vanadium emitter of the detector and the electric potential build-up in the insulator of the detector, can still change significantly as the detector is used. However, with an accurate history of the effects of neutron flux on the detectors, the method and apparatus of the present invention provide a calibration of the detectors that allows the calibrated detectors to provide useful signals regarding neutron flux for extended periods of time, and, preferably, over several reactor cycles.

In contrast to most prior art vanadium self-powered in-core neutron detectors, vanadium detectors useful in the present invention are not full length. The length of the vanadium detector in each detector pair is substantially the same as that of the rhodium detector in the pair, i.e. typically about 5 to 15 inches but depending on the need can be larger or as small as less than 1 inch. Therefore, the issues raised in U.S. Pat. No. 5,251,242 regarding the output signal of the single long vanadium detector, which can only characterize a spatial integral of the complex and time varying axial power distribution of the reactor, are resolved automatically, and, thus, are not present with the present invention.

Preferably, in the present invention, both the reference and calibrated detectors, preferably, rhodium and vanadium, respectively, have twin leads that eliminate almost all gamma radiation-induced background signals, so that the detectors provide a response to the neutron flux that is not affected by gamma radiation. Preferably, the gamma radiation background signal is subtracted from the detector signal using a preamplifier circuit. Alternatively, the gamma radiation background signal can be subtracted from the detector signal using an algorithm in the data acquisition system.

In addition, the calibrated detectors, which are preferably vanadium detectors, although significantly shorter than prior art full length detectors, are prepared in a manner that provides as much emitter material as possible to provide the maximum possible signals.

The present invention provides a relationship between the signal strength and the lifetime of a calibrated detector, such as a vanadium detector, which allows the known relationship between the signal strength and the lifetime of a reference detector, such as a rhodium detector, to be extended to a higher level of emitter burnout. That is, once the first or calibrated detector is calibrated using the output of the second or reference detector, the calibrated detector can be used to recalibrate a depleted reference detector, extending the useful lifetime of reference detector. This provides a two-way calibration. All that is required is that the reference detector has known emitter depletion characteristics, such as those illustrated in FIGS. 8 and 9 for rhodium self-powered neutron detectors.

An apparatus in accordance with the present invention is illustrated in FIG. 1. FIG. 1 illustrates a typical nuclear power reactor configuration in which the in-core flux monitoring system (17) accesses the reactor core (10) through an in-core instrumentation tank (11) and through the reactor vessel bottom head (42). The present invention is useful in other reactor types that have a "seal table" in place of an in-core tank, or in which the in-core flux monitoring system accesses the reactor core through a reactor vessel top head (41) instead of a reactor vessel bottom head (42). The present invention is applicable to, and will function in, any of those reactor types.

As illustrated in FIG. 1, an in-core flux monitoring system (17) is fixed during reactor operation and continuously measures core neutron flux. Neutron flux measurements are obtained from detector assemblies (12) positioned in selected locations within the core (10).

Figure 2:
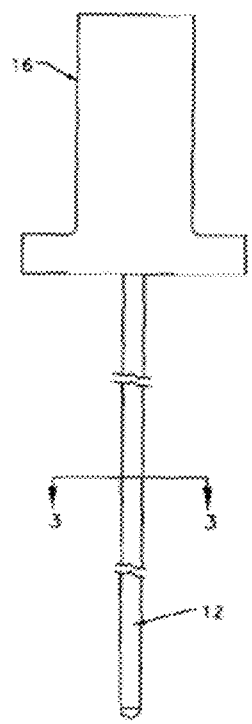
FIG. 2 illustrates a detector assembly of the invention, comprising multiple detectors.
Figure 3:
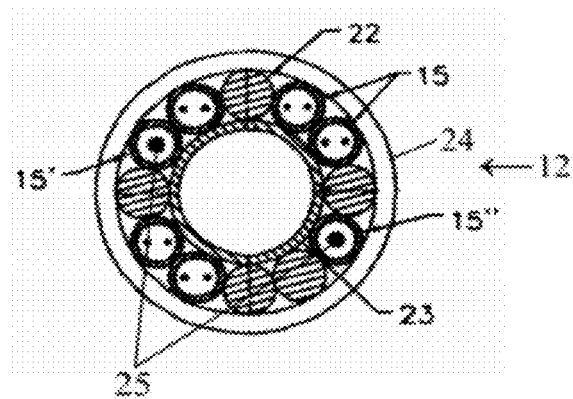
FIG. 3 illustrates a cross-section at 3-3 of the detector assembly illustrated in FIG. 2.
Figure 4:
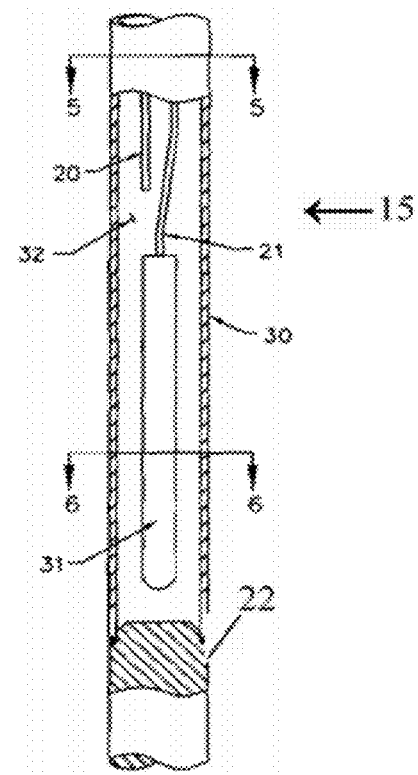
FIG. 4 illustrates a self-powered neutron detector useful in the invention.

FIGS. 2 and 3 illustrate a detector assembly configuration in accordance with the invention comprising multiple pairs of self-powered neutron detectors of the type illustrated in FIG. 4. The pairs of self-powered neutron detectors (25), illustrated in FIG. 3, are located at different axial positions in the detector assembly (12) to measure the flux at different axial elevations within the core (10), as needed for the nuclear core monitoring. Each detector assembly (12) is inserted into the instrumentation tube of a nuclear fuel assembly. As illustrated in FIG. 1, a guide tubing (14) extends from the bottom of the fuel assembly (43) through the reactor vessel bottom head (42), and terminates in an in-core instrumentation tank (11) or seal table. As illustrated in FIG. 2, the detector assembly (12) will include a pressure boundary flange (16) of appropriate design to provide a seal and to prevent the loss of reactor coolant water during reactor operations. It will be understood by those skilled in the art that the external diameter of the detector assembly must be such that the detector assembly can be inserted into the guide tubing and the instrumentation tube.

Figure 7:
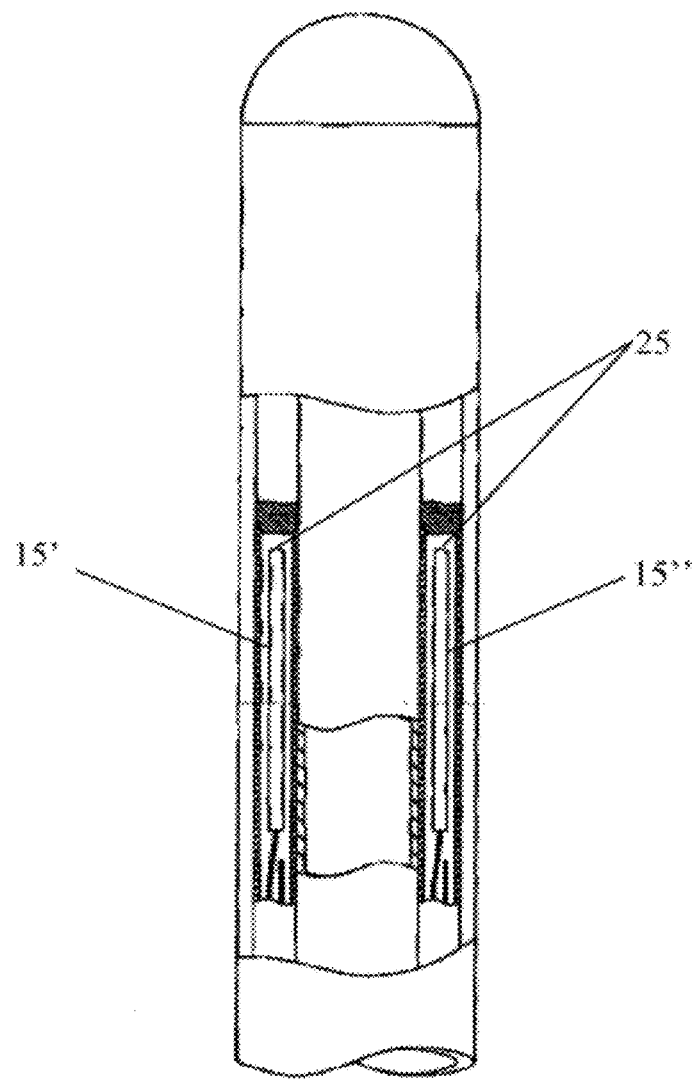
FIG. 7 illustrates a pair of self-powered neutron detectors positioned in an outer sheath, as positioned in an instrumentation tube of a nuclear fuel assembly.

The detector assembly (12), illustrated in FIG. 2 and FIG. 3, comprises several self-powered neutron detectors (15) illustrated in FIG. 4, which are spaced axially along the length of the active fuel height of the core (10) illustrated in FIG. 1. Preferably, as illustrated in FIG. 3, the detectors are arranged inside an outer sheath (24). More preferably they are arranged around a center member (23) that is preferably a tube, solid wire, or a centrally located thermocouple. The material used for the outer sheath (24) and for the tube or the solid wire used as center member is any of the material usable for the collector and is preferably the same as the material of the collector. As illustrated, the detector assembly (12) comprises rhodium detectors (15') and vanadium detectors (15"). For each pair of self-powered neutron detectors (25), the rhodium detector (15') and the vanadium detector (15") are included in the same detector assembly (12) and positioned at the same axial (vertical) level to create a self-powered neutron detector pair (25). Positioning the vanadium detector (15") away from its paired rhodium detector (15') in lateral (transverse) direction, as illustrated in FIG. 7, provides for the precise calibration of the vanadium detector using the output of the paired rhodium detector, providing a combination of high accuracy and long detector life. In certain embodiments, in order to reduce the total number of detectors in a detector assembly (12) and the size (diameter) of the detector assembly (12), the upper and lower most axial positions in a detector assembly (12) may contain only rhodium self-powered neutron detectors (15') provided that the fluxes at those axial positions are much lower so that the burnout of rhodium detectors at those positions would not reach the useful lifetime of a rhodium detector.

Figure 5:
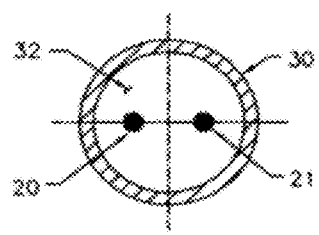
FIG. 5 illustrates a cross-section at 5-5 of the self-powered neutron detector illustrated in FIG. 4.
Figure 6:
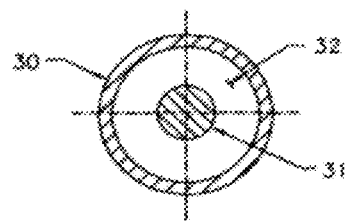
FIG. 6 illustrates a cross-section at 6-6 of the self-powered neutron detector illustrated in FIG. 4.

As illustrated in FIG. 3, filler wires (22) are positioned in the detector assembly to act as spacers to maintain the bundle configuration within the outer sheath (24) of the detector assembly (12) and to axially position the detector. As illustrated in FIG. 4, an emitter (31) is positioned in a self-powered neutron detector (15) of the type illustrated in FIG. 3 and positioned in the detector assembly (12). The self-powered neutron detector (15) has an outer sheath that acts as the detector collector (30), enclosing the neutron sensitive element of the self-powered neutron detector, i.e., the emitter (31). The emitter (31) is preferably either rhodium or vanadium. The self-powered neutron detector (15) has a lead wire (21) connected to the emitter (31) that conveys the detector signal from the emitter (31). The self-powered neutron detector (15) also has a lead wire (20), insulated from the emitter (31), which conveys a background gamma radiation signal. Both lead wires (20) and (21) are surrounded by ceramic insulation (32), such as aluminum oxide, positioned within the collector (30). FIGS. 5 and 6 illustrate the details of the detector (15), as illustrated in FIG. 4, in cross-section.

When exposed to a neutron flux in a nuclear reactor, neutrons are absorbed by nuclei of emitter atoms in an emitter (31) of self-powered neutron detectors (15') and (15"), transmuting the nuclei of the atoms, and resulting in beta decay. At least a portion of the emitted beta electrons are absorbed by the collector (30), producing a current in the detector lead wire (21). At the same time, a current is typically produced in the lead wire (21) as a result of background gamma radiation. Preferably, a gamma radiation signal is also produced in the lead wire (20) that is insulated from the emitter (31). By subtracting the background gamma radiation signal in the lead wire (20) from the signal in the lead wire (21), a signal proportional to the neutron flux is preferably obtained from the self-powered neutron detectors (15') and (15").

The self-powered neutron detectors (15') and (15") are exposed to substantially the same neutron flux at any given time. Thus, at any given time, each of the signals produced by the self-powered neutron detectors (15') and (15") are proportional to the neutron flux, but will have different amplitudes due to the difference in the properties of the emitters of the reference and calibrated detectors. The relationship between the signals produced by the reference and calibrated detectors is determined, allowing the depletion characteristics of the calibrated detector, such that the calibrated detector can be calibrated.

The invention is described above in terms of a pair of self-powered neutron detectors (25). However, each detector assembly typically comprises at least four detectors, where two of the detectors form a first pair (25), and the other two detectors form a second pair (25). Preferably, the detector assembly comprises 12 detectors, where ten of the detectors form five pairs (25), and two of the detectors are individual detectors, as described above. Most preferably, the first detector in each pair has a vanadium emitter, and is paired with a second detector, having a rhodium emitter, used to calibrate the vanadium emitter. Most preferably, the individual detectors have rhodium emitters.

What is claimed:

1. A method for calibrating a first self-powered neutron detector with a second self-powered neutron detector for long term use of the first and second self-powered neutron detectors in a nuclear reactor core, the method comprising:

exposing at least one pair of self-powered neutron detectors to a neutron flux in a nuclear reactor, each of the self-powered neutron detectors in the pair producing a signal proportional to the same neutron flux;

the pair comprising a first self-powered neutron detector and a second self-powered neutron detector; wherein each self-powered neutron detector in the pair comprises an emitter and a collector;

the emitter of the first self-powered neutron detector in each pair comprising a first emitter material, and the emitter of the second self-powered neutron detector in each pair comprising a second emitter material; wherein the second emitter material has a neutron absorption cross-section that is greater than the neutron absorption cross-section of the first emitter material;

simultaneously measuring the response of each of the first and second self-powered neutron detectors to the same neutron flux in the nuclear reactor core; and calibrating the signal produced by the first self-powered neutron detector in the pair in response to the neutron flux with the signal produced by the second self-powered neutron detector in the pair in response to the neutron flux over a period of time sufficient to determine the thermal neutron sensitivity for the first emitter material for a given emitter depletion.

2. The method according to claim 1, wherein the emitter of the first self-powered neutron detector comprises vanadium, and the emitter of the second self-powered neutron detector comprises rhodium.

3. The method according to claim 1 or 2, further comprising monitoring the neutron flux within the nuclear reactor core with the second self-powered neutron detector until the emitter material in the second self-powered neutron detector is depleted, and then monitoring the neutron flux with the calibrated first self-powered neutron detector.

4. The method according to claim 3, further comprising calibrating the response of a depleted second self-powered neutron detector with the response from a calibrated first self-powered neutron detector.

5. A method for calibrating a self-powered neutron detector having a vanadium emitter with a second self-powered neutron detector having a rhodium emitter for long term use of the first and second self-powered neutron detectors in a nuclear reactor core, the method comprising:
- exposing at least one pair of self-powered neutron detectors to a neutron flux in a nuclear reactor, each of the self-powered neutron detectors in the pair producing a signal proportional to the same neutron flux;
- the pair comprising a first self-powered neutron detector having a vanadium emitter and a second self-powered neutron detector having a rhodium emitter;
- simultaneously measuring the response of each of the first and second self-powered neutron detectors to the same neutron flux in the nuclear reactor core; and
- calibrating the signal produced by the first self-powered neutron detector in the pair in response to the neutron flux with the signal produced by the second self-powered neutron detector in the pair in response to the neutron flux over a period of time sufficient to determine the thermal neutron sensitivity for the vanadium emitter for a given vanadium emitter depletion, providing a calibrated vanadium detector.

6. The method according to claim 5, further comprising monitoring the neutron flux within the nuclear reactor core with the second self-powered neutron detector until the emitter material in the second self-powered neutron detector is depleted, and then monitoring the neutron flux with the calibrated first self-powered neutron detector.

7. The method according to claim 5, further comprising calibrating the response of the rhodium self-powered neutron detector of a pair of self-powered neutron detectors with the response from the calibrated vanadium self-powered neutron detector of the pair of self-powered neutron detectors.

8. An apparatus for detecting and measuring a nuclear flux density within an operating nuclear reactor, the apparatus comprising at least one pair of self-powered neutron detectors, each self-powered neutron detector producing a signal proportional to a neutron flux when exposed to the neutron flux; the pair comprising a first self-powered neutron detector and a second self-powered neutron second detector; wherein each of the first and second self-powered neutron detectors in the pair comprises an emitter and a collector; the emitter of the first self-powered neutron detector in each pair comprising a first emitter material, and the emitter of the second self-powered neutron detector in each pair comprising a second emitter material; wherein the second emitter material has a neutron absorption cross-section that is greater than the neutron absorption cross-section of the first emitter material; and wherein both detectors of the pair are positioned within a nuclear reactor, such that the first and second self-powered neutron detectors in the pair are exposed to the same neutron flux field; the second self-powered neutron detector providing a calibration signal for the first self-powered neutron detector of the pair when exposed to a neutron flux, wherein the apparatus is configured to calibrate the signal produced by the first self-powered neutron detector in the pair in response to the neutron flux with the signal produced by the second self-powered neutron detector in the pair in response to the neutron flux over a period of time sufficient to determine the thermal neutron sensitivity for the first emitter material for a given emitter depletion.

9. The apparatus according to claim 8, wherein the first emitter material is vanadium, and the second emitter material is rhodium.

* * * * *